F. A. DANIELS AND G. SCHUSTER.
RABBETING APPARATUS.
APPLICATION FILED JUNE 27, 1919.
1,346,079.
Patented July 6, 1920.
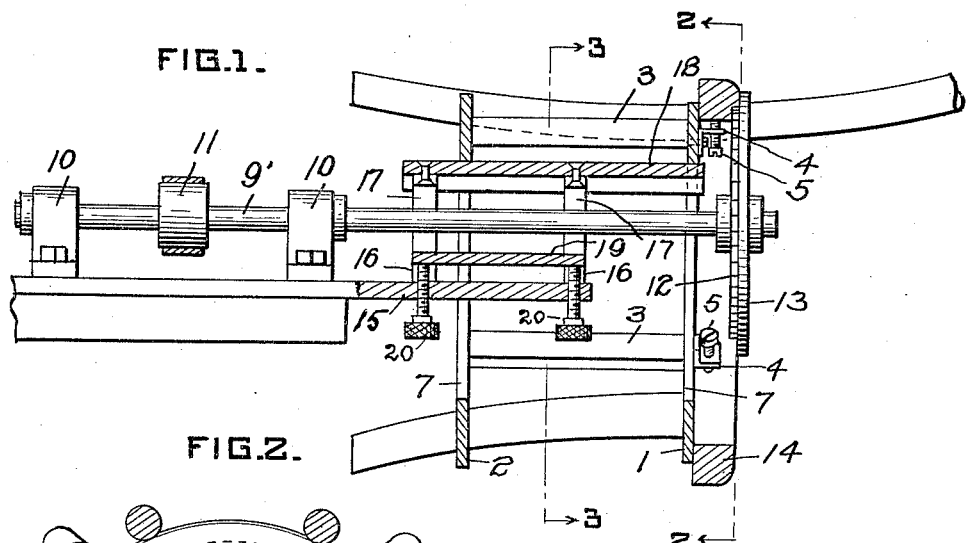
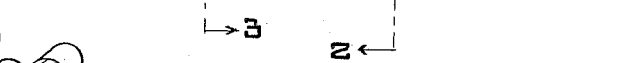
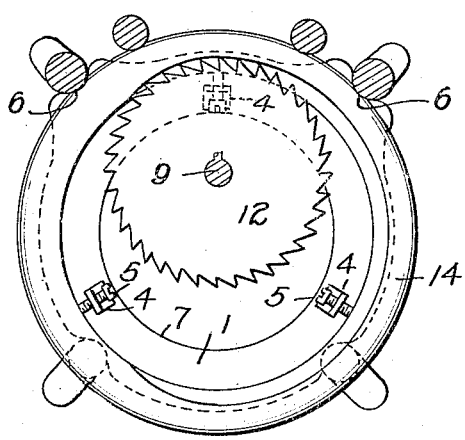
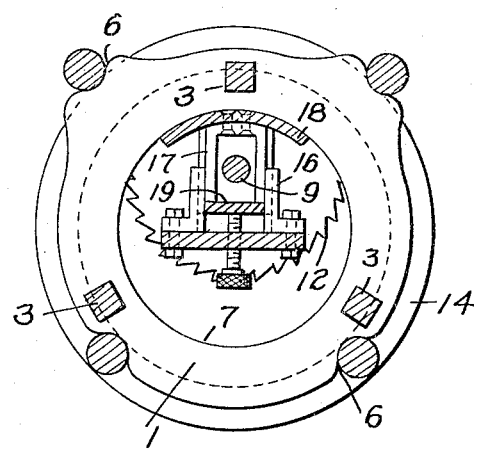
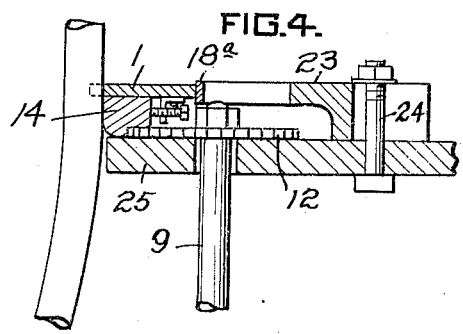
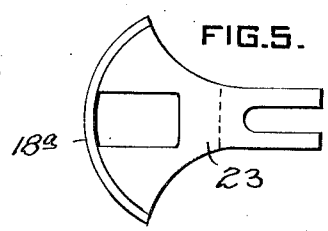
WITNESSES
INVENTORS

UNITED STATES PATENT OFFICE.

FRANK A. DANIELS, OF PITTSBURGH, AND GEORGE SCHUSTER, OF CARRICK BOROUGH, PENNSYLVANIA.

RABBETING APPARATUS.

1,346,079.  Specification of Letters Patent.  Patented July 6, 1920.

Application filed June 27, 1919. Serial No. 307,195.

*To all whom it may concern:*

Be it known that we, FRANK A. DANIELS, of Pittsburgh, Pennsylvania, and GEORGE SCHUSTER, of Carrick borough, Allegheny county, Pennsylvania, have invented a new and useful Improvement in Rabbeting Apparatus, of which the following is a specification.

This invention relates to devices for use in connection with rabbeting saws for the purpose of cutting circular, elliptical or other rabbets. One particular use of the device is to cut countersunk seats or rabbets in the frame ring of certain types of chairs, in order to receive circular fiber or wooden seats. The device however can be used for cutting rabbets of other shapes in other articles besides chair seats.

The object of the invention is to provide devices for centering the article or piece in which the rabbet is to be cut, and guiding it relative to the rabbeting saw, and so arranged that true circular or other outline of rabbets, of uniform depth, can be cut quickly and with a minimum amount of labor.

The invention comprises the construction and arrangement of parts hereinafter described.

In the accompanying drawings Figure 1 is a side view, partly in section, of one application of the invention; Figs. 2 and 3 are transverse sections thereof on the lines 2—2 and 3—3, Fig. 1; Fig. 4 is a sectional view showing another application of the invention; and Fig. 5 is a plan view of the guide of Fig. 4.

The invention will be described particularly for cutting rabbets in the upper inner side of circular seat frame member of certain types of chairs, particularly those formed of bent wood and which are provided either with woven cane seats or with seats formed of fiber or cross plies of veneer. The devices of this invention are useful for cutting the rabbets in such seat frame either when new, to receive the wooden or fiber seats, or for purposes of repair when the cane seats wear out.

The centering device shown in Figs. 1 to 3 comprises two rings, 1 and 2 joined by two or more longitudinal members 3 in a manner to hold the two rings in rigid relation and in alinement with each other. One of these rings, such as the ring 1, is provided with a plurality (three or more) of adjustable clamping and centering means, these means being illustrated as angle brackets 4 secured to the ring 1 and having adjusting screws 5 tapped through their vertical legs. The frame itself may be formed of any suitable material, either wood, or metal. The brackets 4 obviously will be formed of metal. The rings 1 and 2 will be of a size to enter between the legs of the chair, and preferably the rings will be quite wide, and provided on their peripheries with four cut away or notched portions 6 to allow for the passage of the chair legs and assist in properly positioning the centering ring in the chair. This frame is slipped up between the legs of the chair (the lower frame ring between legs of certain types of chairs being first removed) with the upper ring 1 bearing against the bottom of the frame ring of the chair, after which the screws 5 are adjusted into contact with the inner face of said ring and in a manner to properly center the frame relative to the chair ring, which can be readily determined by a rule, gage or other measure. The inner faces 7 of the rings 1 and 2 will be formed as circles (or other form) and of a diameter to permit cutting the rabbets of the smallest diameter desired.

This centering frame can be used for guiding the rabbets with the use of an ordinary rabbeting saw, without further devices. In Fig. 1 is shown an ordinary rabbeting saw, comprising shaft 9 mounted in bearings 10 and provided with pulley 11 or other driving means and carrying the rabbeting saw 12 at its outer end. In conjunction with this saw is a guide disk 13, which is of larger diameter than the saw and serves as a gage to determine the depth of the rabbet, and insure the rabbet being cut of uniform depth throughout. This saw can be used with the centering frame for cutting rabbets by merely passing the legs of the chairs, with the centering frame therein, over the saw and guiding the centering frame on the shaft itself. In other words, the inner peripheries 7 of the rings 1 and 2 rest on the shaft, with the upper face of the seat ring 14 of the chair bearing against the gage plate 13, whereby a saw of proper diameter will cut a rabbet on the top face of the said seat ring on its inner edge. The workman, by hand, will rotate the chair, with the centering frame therein, around the shaft as the cutting proceeds.

When this method is followed only one diameter of rabbet can be formed with any centering frame. By slipping collars or sleeves of different thickness over the saw shaft 9, thus in effect increasing the diameter of said shaft, rabbets of different diameters can be cut with the use of the one guide frame.

In order to relieve the centering frame from any vibration of the saw shaft, and also enable a single centering frame to be used for cutting rabbets of various diameters, it is preferred to use an adjustable guide for supporting the centering frame while cutting the rabbet. One arrangement of guide for this purpose is shown in Figs. 1 to 3. It comprises a suitable support 15 secured in any suitable way to the saw frame and carrying a plurality of standards 16, which on their inner faces are provided with guide grooves for receiving the vertical portions 17 of the guide proper. The vertical members 17 at their upper ends carry the guide or support 18 which will project outwardly sufficiently close to the saw to engage the ring 1, and sufficiently far in the opposite direction to support the ring 2 of the centering frame. The lower ends of the vertical members 17 are engaged by adjusting screws 20 tapped through holes in the support 15, and by means of which the vertical position of the arrangement 18 can be varied. By use of a guide 18 of the character thus described, the centering frame 1, 2 is supported on the outer face of the guide instead of on the saw shaft. Otherwise, the operation incident to the use of the guide 18 is the same as when the centering frame 1, 2 is supported directly upon the shaft. By using a guide 18, the centering frame 1, 2 is not vibrated by the rotation of the shaft, nor is there any tendency of the shaft to rotate or otherwise move the centering frame by reason of frictional contact of the frame upon the shaft. The vertical adjustability of the guide 18 permits a single centering frame to be used for cutting rabbets of various diameters within the vertical limits of the adjustability of the guide 18.

The purpose of having two rings, 1 and 2 for the centering frame is to provide a support at two points, so as to make it easier to hold the article in which the rabbet is to be cut in proper axial alinement with reference to the saw. For certain uses however a single centering ring will suffice. For instance Fig. 4 shows the centering device composed of a single ring 1 which is guided in proximity to the cutter or saw 12 of a so-called shaping machine, in which the shaft of the saw is vertical and extends through the table 25 of the shaper. In this instance the guide 18$^a$ is carried by a bracket 23 which has an adjustable connection, by slot and bolt 24, with the table 25 of the shaper. The table 25 of the shaper, in this embodiment, forms the gage which determines the depth of the rabbet.

Any other suitable type of rabbeting, shaping or cutting machine can obviously be used. The device described can be used not only for cutting circular rabbets, but also oval or even substantially rectangular rabbets, by merely shaping the inner periphery of the centering ring or frame to correspond with that of the desired periphery of the rabbet to be cut. The use of this device for cuting rabbets in circular chair seats is merely illustrative of one use thereof. Various changes can obviously be made in the form, shape and size of the parts.

We claim:

1. A centering device for use in cutting rabbets, comprising a frame provided with a plurality of radial adjustable clamping members for attachment to the article being rabbeted, the inner periphery of said frame being of the contour of the periphery of the rabbet to be cut and arranged to contact with and move on a support adjacent a rabbeting saw.

2. A centering device for use in cutting rabbets, comprising a pair of transverse members, longitudinal members connecting said transverse members, and a plurality of radial adjustable clamping members carried by one of said transverse members and arranged to clamp said centering device to the article being rabbeted, the inner peripheries of said transverse members being of the contour of the periphery of the rabbet to be cut.

3. Devices for use in cutting rabbets, comprising a frame provided with means for clamping and centering the article to be cut and having its inner periphery of the contour of the periphery to be cut, in combination with a support mounted adjacent a rabbeting saw and arranged to engage the inner periphery of said frame and guide it in proximity to the saw.

4. Devices for use in cutting rabbets, comprising a frame provided with means for clamping the same to and centering the same on the article to be provided with a rabbet, the inner periphery of said frame being of the contour of the periphery of the rabbet to be cut, a guide adjacent the axis of a rabbeting saw and arranged to engage the inner periphery of said frame, and means for adjusting the position of said guide toward and from the saw axis.

In testimony whereof we have hereunto set our hands.

FRANK A. DANIELS.
GEORGE SCHUSTER.

Witness:
G. G. GRILL.